(12) United States Patent
Kobayashi et al.

(10) Patent No.: US 9,581,242 B2
(45) Date of Patent: Feb. 28, 2017

(54) FLUID PRESSURE CYLINDER AND MANUFACTURING METHOD THEREFOR

(71) Applicant: KYB-YS CO., LTD., Hanishina-gun, Nagano (JP)

(72) Inventors: Nobuyuki Kobayashi, Nagano (JP); Sadayuki Kamikura, Nagano (JP)

(73) Assignee: KYB-YS CO., LTD., Nagano (JP)

( * ) Notice: Subject to any disclaimer, the term of this patent is extended or adjusted under 35 U.S.C. 154(b) by 282 days.

(21) Appl. No.: 14/355,569

(22) PCT Filed: Oct. 10, 2012

(86) PCT No.: PCT/JP2012/076177
§ 371 (c)(1),
(2) Date: Apr. 30, 2014

(87) PCT Pub. No.: WO2013/065457
PCT Pub. Date: May 10, 2013

(65) Prior Publication Data
US 2014/0251126 A1    Sep. 11, 2014

(30) Foreign Application Priority Data

Nov. 1, 2011 (JP) .................................. 2011-240133

(51) Int. Cl.
*F16J 10/02* (2006.01)
*F15B 15/14* (2006.01)

(52) U.S. Cl.
CPC ............. *F16J 10/02* (2013.01); *F15B 15/149* (2013.01); *F15B 15/1457* (2013.01); *Y10T 29/4927* (2015.01)

(58) Field of Classification Search
CPC ...... F16J 10/02; F15B 15/1457; F15B 15/149
(Continued)

(56) References Cited

U.S. PATENT DOCUMENTS 3,279,561 A    10/1966 Flanagan et al.
7,322,273 B2 *  1/2008 Rafn ..................... F15B 15/149
                                                411/303
(Continued)

FOREIGN PATENT DOCUMENTS

CN    101307788 A    11/2008
JP    1-78706 U  *   5/1989
(Continued)

OTHER PUBLICATIONS

Office Action dated Jul. 27, 2015, corresponding to Chinese patent application No. 201280052788.X.
(Continued)

*Primary Examiner* — Thomas E Lazo
(74) *Attorney, Agent, or Firm* — Hauptman Ham, LLP

(57) ABSTRACT

A fluid pressure cylinder includes a cylinder tube, a piston and a solid piston rod. The piston rod includes a head-side passage defined by a head-side shaft hole extending in an axial direction, a head-side outer hole open on a part projecting from the cylinder tube and a head-side inner hole open to a head-side chamber and allowing communication between a head-side chamber and a fluid pressure source, and a bottom-side passage allowing communication between a bottom-side chamber and the fluid pressure source. The head-side shaft hole includes an opening end and a tip formed inside the piston rod. The opening end of the head-side shaft hole is sealed by a sealing member.

6 Claims, 2 Drawing Sheets

(58) Field of Classification Search
USPC .......................................................... 92/111
See application file for complete search history.

(56) References Cited

U.S. PATENT DOCUMENTS

| | | |
|---|---|---|
| 7,654,188 B2 | 2/2010 | Sakada et al. |
| 2006/0032369 A1 | 2/2006 | Rafn |
| 2007/0289439 A1 | 12/2007 | Sakada et al. |

FOREIGN PATENT DOCUMENTS

| | | |
|---|---|---|
| JP | 2560871 Y2 | 1/1998 |
| JP | 10-131968 A | 5/1998 |
| JP | 2000-240609 A | 9/2000 |
| JP | 2003-166508 A | 6/2003 |
| JP | 2006-27442 A | 2/2006 |

OTHER PUBLICATIONS

International Search Report mailed Jan. 15, 2013, in corresponding International Application No. PCT/JP2012/076177.
"Manufacturing process of piston rod with a deep hole" MW Metal Cutting, issued on May 15, 2011, vol. 10/2011, pp. 47-48, Beijing, China, for which an explanation of relevance is attached.

* cited by examiner

FLUID PRESSURE CYLINDER AND MANUFACTURING METHOD THEREFOR

RELATED APPLICATIONS

The present application is a National Phase of International Application Number PCT/JP2012/076177, filed Oct. 10, 2012, which claims priority to Japanese Application Number 2011-240133, filed Nov. 1, 2011.

TECHNICAL FIELD

The present invention relates to a fluid pressure cylinder that is expanded and contracted by a working fluid pressure introduced from an external working fluid pressure source and a manufacturing method therefore.

BACKGROUND ART

JP2003-166508A discloses a fluid pressure cylinder in which a head-side passage allowing communication between a head-side chamber and a working fluid pressure source and a bottom-side passage allowing communication between a bottom-side chamber and the working fluid pressure source are provided in a piston rod.

The head-side passage and the bottom-side passage are respectively defined by two shaft holes formed in the solid piston rod. These two shaft holes are formed by inserting cutting tools (drills) through a tip surface of the piston rod to be located in the bottom-side chamber.

The head-side passage is a passage allowing communication between the working fluid pressure source and the head-side chamber and needs to be sealed so as not to communicate with the bottom-side chamber. Thus, a sealing member such as a plug is embedded at an opening end of the shaft hole (head-side shaft hole) defining the head-side passage and open to the bottom-side chamber.

SUMMARY OF INVENTION

In the above conventional fluid pressure cylinder, however, the sealing member embedded at the opening end of the head-side shaft hole may possibly come off into the bottom-side chamber, i.e. a cylinder tube.

It is an object of the present invention to provide a fluid pressure cylinder capable of preventing a sealing member for sealing an opening end of a shaft hole formed in a piston rod from coming off into a cylinder tube and a manufacturing method therefore.

According to one aspect of the present invention, a fluid pressure cylinder is provided. The fluid pressure cylinder includes a tubular cylinder tube, a piston partitioning the interior of the cylinder tube into a head-side chamber and a bottom-side chamber, and a piston rod coupled to the piston. The piston rod is solid and internally provided with a head-side passage allowing communication between the head-side chamber and a working fluid pressure source and a bottom-side passage allowing communication between the bottom-side chamber and the working fluid pressure source, the head-side passage is defined by a head-side shaft hole extending in an axial direction of the piston rod, a head-side outer hole connected to the head-side shaft hole and open on a part of the piston rod projecting from the cylinder tube and a head-side inner hole connected to the head-side shaft hole and open to the head-side chamber, the head-side shaft hole includes an opening end open on the part of the piston rod projecting from the cylinder tube and a tip formed inside the piston rod, and the opening end of the head-side shaft hole is sealed by a sealing member.

Embodiments of the present invention and advantages thereof are described in detail below with reference to the accompanying drawings.

DESCRIPTION OF EMBODIMENTS

Hereinafter, embodiments of the present invention are described with reference to the accompanying drawings.

Figure 1:
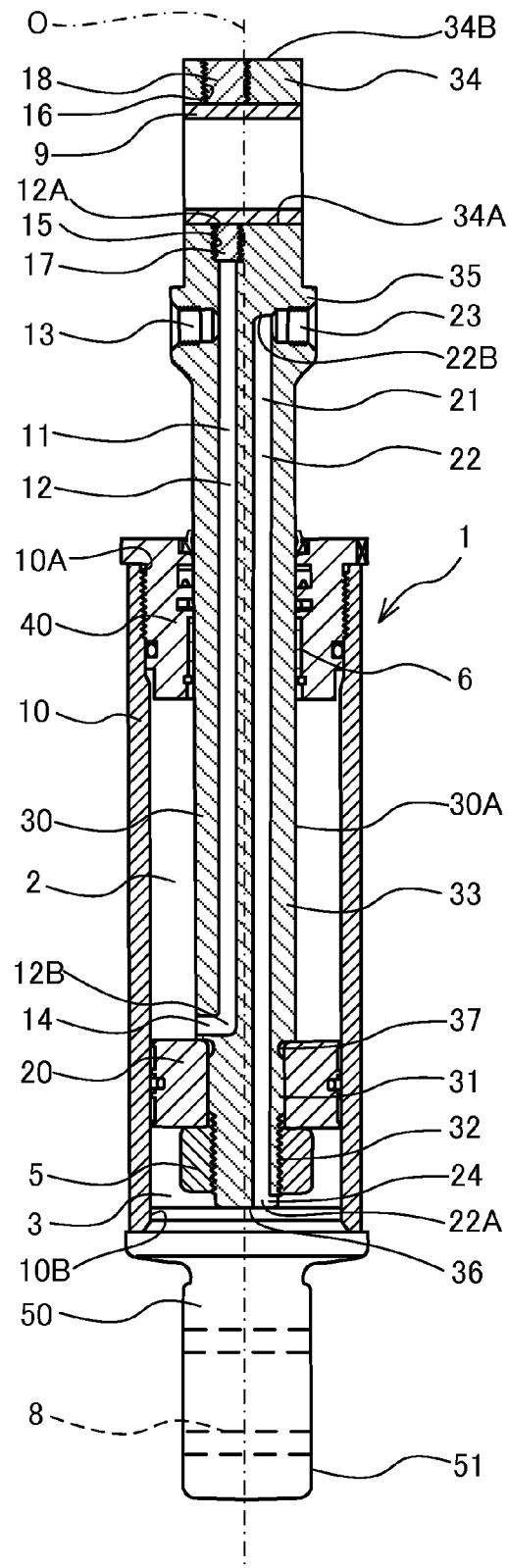
FIG. 1 is a sectional view of a hydraulic cylinder according to an embodiment of the present invention.

As shown in FIG. 1, a hydraulic cylinder (fluid pressure cylinder) 1 includes a tubular cylinder tube 10, a piston 20 partitioning the interior of the hydraulic cylinder 10 into a head-side chamber 2 and a bottom-side chamber 3, and a piston rod 30 coupled to the piston 20.

The hydraulic cylinder 1 is a single rod type and the piston rod 30 projects from one end of the cylinder tube 10. The head-side chamber 2 is provided on a head side where the piston rod 30 projects from the cylinder tube 10, and defined by the cylinder tube 10, the piston 20, the piston rod 30 and a cylinder head 40 to be described later. The bottom-side chamber 3 is provided on a bottom side where the piston rod 30 does not project from the cylinder tube 10, and defined by the cylinder tube 10, the piston 20 and a bottom bracket 50 to be described later.

The piston rod 30 is moved in a direction of a center axis O relative to the cylinder tube 10 by a hydraulic oil pressure (working fluid pressure) introduced from an unillustrated hydraulic pressure source (working fluid pressure source). This causes the hydraulic cylinder 1 to expand and contract, whereby a driven body coupled to the cylinder tube 10 is driven relative to an unillustrated driving body coupled to the piston rod 30.

Although the hydraulic cylinder 1 uses hydraulic oil (oil) as working fluid, working liquid such as water-soluble alternative liquid may be used instead of the hydraulic oil.

The cylinder tube 10 is formed into a hollow cylindrical shape. The cylinder head 40 allowing the piston rod 30 to be slidably inserted therethrough is fastened to a tip side opening (upper end in FIG. 1) 10A of the cylinder tube 10. The cylinder head 40 slidably supports the piston rod 30 via a bearing 6.

It should be noted that the cylinder tube 10 and the cylinder head 40 may be integrally formed.

The bottom bracket 50 is joined to a base end side opening (lower end in FIG. 1) 10B of the cylinder tube 10. The bottom bracket 50 is provided with an annular eye portion 51. A bush (bearing) 8 is fitted to the eye portion 51. A base end part of the cylinder tube 10 is coupled to the driven body via an unillustrated pin inserted into the bush 8.

The piston rod 30 is formed into a solid cylindrical shape. The piston rod 30 includes a right cylindrical rod main body 33 slidably supported in the cylinder head 40, a pipe connecting portion 35 provided on a base end side (upper end side in FIG. 1) of the rod main body 33 and an annular eye portion 34 provided on a base end side of the pipe connecting portion 35.

A bush (bearing) 9 is fitted to the eye portion 34. A base end part of the piston rod 30 is coupled to the driving body via an unillustrated pin inserted into the bush 9.

It should be noted that the bush 9 may be omitted and the base end part of the piston rod 30 may be coupled to the driving body via an unillustrated pin directly inserted into the eye portion 34.

A tip part of the piston rod 30 includes the rod main body 33, a piston supporting portion 31 and a tip screw portion 32 and is so formed that the outer diameter thereof becomes smaller stepwise. The piston 20 is fitted to the piston supporting portion 31 and fastened by a nut 5 threadably engaged with the tip screw portion 32. To prevent the interference of the piston rod 30 and an inner peripheral corner part of the piston 20, an annular groove 37 is formed between the rod main body 33 and the piston supporting portion 31. The piston rod 30 supports the piston 20 by the piston supporting portion 31 and the tip screw portion 32.

Outer diameters of the piston supporting portion 31 and the tip screw portion 32 of the piston rod 30 are smaller than that of the rod main body 33 and an outer diameter of the pipe connecting portion 35 is larger than that of the rod main body 33.

It should be noted that the piston rod 30 and the piston 20 may be integrally formed.

A head-side passage 11 allowing the head-side chamber 2 to communicate with the hydraulic pressure source and a bottom-side passage 21 allowing the bottom-side chamber 3 to communicate with the hydraulic pressure source are provided in the solid piston rod 30. The head-side chamber 2 and the bottom-side chamber 3 communicate with the common hydraulic pressure source. It should be noted that the head-side chamber 2 and the bottom-side chamber 3 may communicate with different hydraulic pressure sources.

As described above, the pipe connecting portion 35 is provided between the rod main body 33 and the eye portion 34 on the base end part of the piston rod 30. A pipe (not shown) allowing the head-side passage 11 and the bottom-side passage 21 to respectively communicate with the hydraulic pressure source is connected to the pipe connecting portion 35.

FIG. 1 shows a state where the hydraulic cylinder 1 is contracted. When the hydraulic cylinder 1 is expanded, the pressurized hydraulic oil supplied from a pump discharge side of the hydraulic pressure source flows into the bottom-side chamber 3 through the bottom-side passage 21. This causes the piston 20 to move to the head side (upper side in FIG. 1), whereby the hydraulic oil in the head-side chamber 2 flows out to a tank side of the hydraulic pressure source through the head-side passage 11. On the other hand, when the hydraulic cylinder 1 is contracted, the pressurized hydraulic oil supplied from the pump discharge side of the hydraulic pressure source flows into the head-side chamber 2 through the head-side passage 11. This causes the piston 20 to move to the bottom side (lower side in FIG. 1), whereby the hydraulic oil in the bottom-side chamber 3 flows out to the tank side of the hydraulic pressure source through the bottom-side passage 21.

The head-side passage 11 includes a head-side shaft hole 12 extending in the direction of the center axis O of the piston rod 30, a head-side outer hole (screw hole) 13 open on the pipe connecting portion 35 of the piston rod 30, and a head-side inner hole (lateral hole) 14 facing the head-side chamber 2 and open on the rod main body 33. The head-side shaft hole 12, the head-side outer hole 13 and the head-side inner hole 14 are respectively formed by machining.

The bottom-side passage 21 includes a bottom-side shaft hole 22 extending in the direction of the center axis O of the piston rod 30, a bottom-side outer hole (screw hole) 23 open on the pipe connecting portion 35 of the piston rod 30, and a groove 24 facing the bottom-side chamber 3 and open on the rod main body 33. The bottom-side shaft hole 22, the bottom-side outer hole 23 and the groove 24 are respectively formed by machining.

Figure 2:
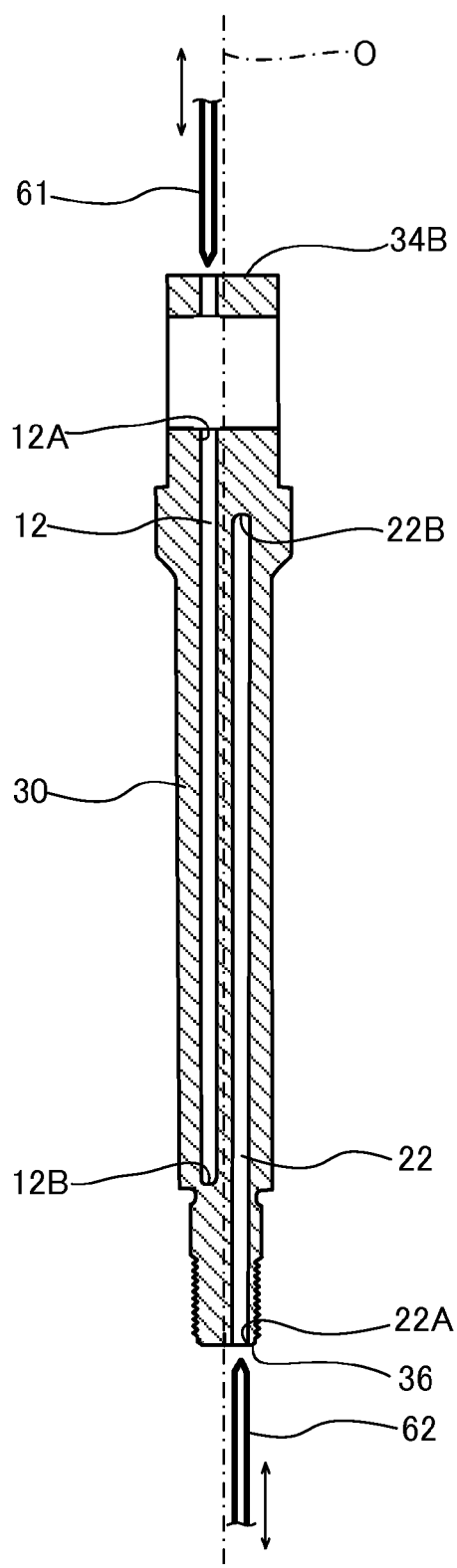
FIG. 2 is a configuration diagram showing a method for manufacturing a piston rod.

Next, a process of forming the head-side passage 11 and the bottom-side passage 21 in the piston rod 30 (head-side, bottom-side passage forming processes) is described. As shown in FIG. 2, the head-side and bottom-side shaft holes 12, 22 are formed by inserting cutting tools 61, 62 in directions opposite to each other along the direction of the center axis O of the piston rod 30.

In the head-side passage forming process of forming the head-side passage 11, the head-side shaft hole 12 is formed by inserting the cutting tool (drill) 61 through an eye portion outer peripheral surface 34B (part of the piston rod 30 projecting from the cylinder tube 10). As shown by arrows in FIG. 2, the cutting tool 61 moves in the direction of the center axis O of the piston rod 30 to form the head-side shaft hole 12 by cutting. In this way, the head-side shaft hole 12 including an opening end 12A open on the part of the piston rod 30 projecting from the cylinder tube 10 and a tip 12B formed inside the piston rod 30 is formed.

In the bottom-side passage forming process of forming the bottom-side passage 21, the bottom-side shaft hole 22 is formed by inserting the cutting tool (drill) 62 through a tip surface 36 (part of the piston rod 30 to be located in the cylinder tube 10). As shown by arrows in FIG. 2, the cutting tool 62 moves in the direction of the center axis O of the piston rod 30 to form the bottom-side shaft hole 22 by cutting. In this way, the bottom-side shaft hole 22 including an opening end 22A communicating with the bottom-side chamber 3 and a tip 22B formed inside the piston rod 30 is formed.

The head-side passage forming process and the bottom-side passage forming process are performed in parallel. A machining time can be reduced by substantially simultaneously inserting the cutting tools 61, 62 in the directions opposite to each other along the direction of the center axis O of the piston rod 30 to form the head-side shaft hole 12 and the bottom-side shaft hole 22.

It should be noted that the bottom-side passage forming process of forming the bottom-side shaft hole 22 may be performed with the orientation of the piston rod 30 supported in a machining apparatus reversed after the head-side passage forming process of forming the head-side shaft hole 12 is performed.

The tip 12B of the head-side shaft hole 12 is arranged at a position in the rod main body 33 before the piston supporting portion 31 and does not communicate with the bottom-side chamber 3. In other words, the tip 12B of the head-side shaft hole 12 is located closer to the opening end 12A of the head-side shaft hole 12 than a part of the piston rod 30 supporting the piston 20, and connected to the head-side inner hole 14 formed later. It should be noted that the head-side shaft hole 12 may be so formed that the tip 12B reaches the piston supporting portion 31 or the tip screw portion 32 as long as it is so structured as not to be open to the bottom-side chamber 3.

The bottom-side shaft hole 22 is continuously arranged in the tip screw portion 32, the piston supporting portion 31 and the rod main body 33 and connected to the hole 23 formed later.

In the piston supporting portion 31 and the tip screw portion 32 of the piston rod 30, the head-side shaft hole 12 is not formed and only the bottom-side shaft hole 22 is formed. This can avoid a reduction in a cross-sectional area of the piston rod 30 in the piston supporting portion 31 and the tip screw portion 32 having smaller outer diameters and a reduction in strength against a load received from the piston 20.

After the head-side shaft hole 12 is formed in the piston rod 30, an inner plug hole 15 open on an inner peripheral surface 34A of the eye portion 34 and an outer plug hole 16 open on each of the inner peripheral surface 34A and an outer peripheral surface 34B of the eye portion 34 are successively coaxially formed. The head-side shaft hole 12, the inner plug hole 15 and the outer plug hole 16 are so formed that opening diameters thereof are larger in this order.

In a process of forming the head-side outer hole 13, the bottom-side outer hole 23 and the head-side inner hole 14, unillustrated cutting tools (drills) are inserted through an outer peripheral surface 30A of the piston rod 30 in directions substantially perpendicular to the direction of the center axis O of the piston rod 30. In this way, the head-side outer hole 13, the bottom-side outer hole 23 and the head-side inner hoe 14 open on the outer peripheral surface 30A of the piston rod 30 are respectively formed to extend in the directions substantially perpendicular to the direction of the center axis O of the piston rod 30. The groove 24 open on the top surface 36 of the piston rod 30 is formed by machining.

As a sealing member for sealing the opening end 12A of the head-side shaft hole 12, the inner plug hole 15 is formed with an internal thread and a plug 17 is mounted by being threadably engaged. It should be noted that a plug may be mounted into the inner plug hole 15 by being press-fitted. By embedding the plug 17 into the inner plug hole 15, one end of the head-side passage 11 can be sealed to prevent the leakage of the hydraulic oil to outside. It should be noted that the sealing member is not limited to the plug 17 and the communication of the head-side shaft hole 12 with the outside may be blocked using another member such as a driving plug or a steel ball.

The outer plug hole 16 is formed with an internal thread and a plug 18 is mounted by being threadably engaged. It should be noted that a plug may be mounted into the outer plug hole 16 by being press-fitted. By embedding the plug 18 into the outer plug hole 16, the entrance of foreign matters via the outer plug hole 16 is prevented and the rigidity of the eye portion 34 is improved.

At the time of assembling the piston rod 30, the plug 17 is first mounted into the inner plug hole 15. Thereafter, the bush 9 is mounted on the inner peripheral surface 34A of the eye portion 34. Finally, the plug 18 is mounted into the outer plug hole 16.

Even if the plug 17 is going to come out from the inner plug hole 15, such a movement is stopped by the bush 9. Thus, the detachment of the plug 17 from the inner plug hole 15 is avoided and the head-side passage 11 is maintained in a sealed state.

Since the plugs 17, 18 are provided in the part of the piston rod 30 projecting out from the cylinder tube 10, even if the plug comes out from the inner or outer plug hole 15 or 16, the fall thereof into the cylinder tube 10 is avoided.

Functions and effects of the present embodiment are described below. In the present embodiment, the fluid pressure cylinder (hydraulic cylinder 1) is assumed which is expanded and contracted by the working fluid pressure introduced from the external working fluid pressure source.

The fluid pressure cylinder (hydraulic cylinder 1) of the present embodiment includes the tubular cylinder tube 10, the piston 20 partitioning the interior of the cylinder tube 10 into the head-side chamber 2 and the bottom-side chamber 3 and the piston rod 30 coupled to the piston 20. The solid piston rod 30 is internally provided with the head-side passage 11 and the bottom-side passage 21. The head-side passage 11 is defined by the head-side shaft hole 12 extending in an axial direction of the piston rod 30, the head-side outer hole 13 connected to the head-side shaft hole 12 and open on the part of the piston rod 30 projecting from the cylinder tube 10 and the head-side inner hole 14 connected to the head-side shaft hole 12 and open to the head-side chamber 2, and allows the head-side chamber 2 to communicate with the working fluid pressure source via the head-side inner hole 14, the head-side shaft hole 12 and the head-side outer hole 13. The bottom-side passage 21 allows the bottom-side chamber 3 to communicate with the working fluid pressure source. The head-side shaft hole 12 includes the opening end 12A open on the part of the piston rod 30 projecting from the cylinder tube 10 and the tip 12B formed inside the piston rod 30. The fluid pressure cylinder further includes the sealing member (plug 17) for sealing the opening end 12A of the head-side shaft hole 12.

In this way, the working fluid is supplied and discharged between the head-side chamber 2 and the working fluid pressure source via the head-side shaft hole 12, the head-side outer hole 13 and the head-side inner hole 14.

Since the head-side shaft hole 12 is structured to include no opening end in the bottom-side chamber 3, a sealing member for closing the head-side shaft hole 12 and the bottom-side chamber 3 is not provided in the first place and there is no likelihood that such a sealing member or the like comes off into the cylinder tube 10.

The tip 12B of the head-side shaft hole 12 is located closer to the opening end 12A of the head-side shaft hole 12 than the part of the piston rod 30 supporting the piston 20. The bottom-side passage 21 is defined by the bottom-side shaft hole 22 including the opening end 22A open to the bottom-side chamber 3 and extending in the axial direction (direction of the center axis O) of the piston rod 30 beyond the part of the piston rod 30 supporting the piston 20.

Since the cross-sectional area of the part (piston supporting portion 31, tip screw portion 32) of the piston rod 30 supporting the piston 20 is reduced by the bottom-side passage 21, but not reduced by the head-side shaft hole 12, a reduction in strength can be suppressed and a reduction in the diameter of the piston rod 30 can be realized.

The conventional fluid pressure cylinder is so structured that the two shaft holes defining the head-side passage and the bottom-side passage penetrate through the piston supporting portion of the piston rod. Thus, there have been a problem that a cross-sectional area of the piston supporting portion is reduced by the two penetrating shaft holes despite the piston supporting portion being a part where the outer diameter of the piston rod is small and the strength of the piston rod is impaired. Contrary to this, since only one shaft hole penetrates through the piston supporting portion 31 in the present embodiment, the strength of the piston rod 30 can be improved as compared with the conventional fluid pressure cylinder.

The piston rod 30 includes the annular eye portion 34 on the part projecting from the cylinder tube 10. The inner plug hole 15 open on the inner peripheral surface 34A of the eye portion 34 is formed at the opening end 12A of the head-side shaft hole 12. The plug 17 as the sealing member for sealing the opening end 12A of the head-side shaft hole 12 is embedded into the inner plug hole 15.

Since this causes the inner plug hole 15 to be closed by the bush 9 or a pin (not shown) disposed on the eye portion 34 after the plug 17 is embedded, the detachment of the plug 17 from the inner plug hole 15 can be prevented.

In the piston rod 30, the outer plug hole 16 open on the inner and outer peripheral surfaces 34A, 34B of the eye portion 34 is formed and the outer plug hole 16, the inner plug hole 15 and the head-side shaft hole 12 are coaxially formed.

This enables the head-side shaft hole 12 to be formed in the piston rod 30 including the eye portion 34.

The method for manufacturing the fluid pressure cylinder (hydraulic cylinder 1) of the present embodiment includes the head-side passage forming process of forming the head-side passage 11 by the cutting tool 61 inserted through the part (eye portion outer peripheral surface 34B) of the piston rod 30 projecting from the cylinder tube 10 and the bottom-side passage forming process of forming the bottom-side passage 21 by the cutting tool 62 inserted through the part (tip surface 36) of the piston rod 30 to be located in the cylinder tube 10.

This causes the sealed state of the head-side passage 11 to be maintained and enables the fluid pressure cylinder (hydraulic cylinder 1) capable of improving the strength of the piston rod 30 to be manufactured.

In the method for manufacturing the fluid pressure cylinder (hydraulic cylinder 1) of the present embodiment, the head-side passage forming process and the bottom-side passage forming process are performed in parallel.

Since this enables the cutting tools 61, 62 to be simultaneously inserted in the directions opposite to each other along the direction of the center axis O of the piston rod 30, it is possible to reduce the manufacturing time and improve productivity.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-240133 filed with the Japan Patent Office on Nov. 1, 2011, all the contents of which are hereby incorporated by reference.

The invention claimed is:

1. A fluid pressure cylinder, comprising:
    a tubular cylinder tube;
    a piston partitioning the interior of the cylinder tube into a head-side chamber and a bottom-side chamber; and
    a piston rod coupled to the piston, wherein:
    the piston rod is solid and internally provided with a head-side passage allowing communication between the head-side chamber and a working fluid pressure source and a bottom-side passage allowing communication between the bottom-side chamber and the working fluid pressure source;
    the head-side passage is defined by a head-side shaft hole extending in an axial direction of the piston rod, a head-side outer hole connected to the head-side shaft hole and open on a part of the piston rod projecting from the cylinder tube and a head-side inner hole connected to the head-side shaft hole and open to the head-side chamber;
    the head-side shaft hole includes an opening end open on the part of the piston rod projecting from the cylinder tube and a tip formed inside the piston rod;
    the opening end of the head-side shaft hole is sealed by a sealing member;
    the tip of the head-side shaft hole is located closer to the opening end of the head-side shaft hole than a part of the piston rod supporting the piston; and
    the bottom-side passage is defined by a bottom-side shaft hole including an opening end open to the bottom-side chamber and extending in the axial direction of the piston rod beyond the part of the piston rod supporting the piston.

2. A fluid pressure cylinder, comprising:
    a tubular cylinder tube;
    a piston partitioning the interior of the cylinder tube into a head-side chamber and a bottom-side chamber; and
    a piston rod coupled to the piston, wherein:
    the piston rod is solid and internally provided with a head-side passage allowing communication between the head-side chamber and a working fluid pressure source and a bottom-side passage allowing communication between the bottom-side chamber and the working fluid pressure source;
    the head-side passage is defined by a head-side shaft hole extending in an axial direction of the piston rod, a head-side outer hole connected to the head-side shaft hole and open on a part of the piston rod projecting from the cylinder tube and a head-side inner hole connected to the head-side shaft hole and open to the head-side chamber;
    the head-side shaft hole includes an opening end open on the part of the piston rod projecting from the cylinder tube and a tip formed inside the piston rod;
    the opening end of the head-side shaft hole is sealed by a sealing member;
    the piston rod includes an annular eye portion on the part projecting from the cylinder tube;
    an inner plug hole open on an inner peripheral surface of the eye portion is formed at the opening end of the head-side shaft hole; and
    a plug is embedded as the sealing member into the inner plug hole.

3. A method for manufacturing a fluid pressure cylinder in which a head-side passage allowing communication between a head-side chamber and a working fluid pressure source and a bottom-side passage allowing communication between a bottom-side chamber and the working fluid pressure source are provided in a solid piston rod, comprising:
    a head-side passage forming process of forming the head-side passage by a cutting tool inserted through a part of the piston rod projecting from a cylinder tube; and
    a bottom-side passage forming process of forming the bottom-side passage by a cutting tool inserted through a part of the piston rod to be located in the cylinder tube.

4. The method for manufacturing the fluid pressure cylinder according to claim 3, wherein:
    the head-side passage forming process and the bottom-side passage forming process are performed in parallel.

5. The method according to claim 3, further comprising:
    a closing process of closing an opening end of the head-side passage at the part of the piston rod projecting from the cylinder tube, said closing process using a sealing member to close said opening end.

6. A fluid pressure cylinder, comprising:
    a tubular cylinder tube;
    a piston partitioning the interior of the cylinder tube into a head-side chamber and a bottom-side chamber; and
    a piston rod coupled to the piston, wherein:

the piston rod is solid and internally provided with
- a head-side passage allowing communication between the head-side chamber and a working fluid pressure source, and
- a bottom-side passage allowing communication between the bottom-side chamber and the working fluid pressure source;

the head-side passage is defined by
- a head-side shaft hole extending in an axial direction of the piston rod,
- a head-side outer hole connected to the head-side shaft hole and opening on a part of the piston rod projecting from the cylinder tube, and
- a head-side inner hole connected to the head-side shaft hole and opening to the head-side chamber;

the head-side shaft hole includes
- an opening end open on the part of the piston rod projecting from the cylinder tube, and
- a tip formed inside the piston rod;

the opening end of the head-side shaft hole is sealed by a sealing member;

the bottom-side passage is defined by
- a bottom-side shaft hole extending in the axial direction of the piston rod, and
- a bottom-side outer hole connected to the bottom-side shaft hole and opening on another part of the piston rod projecting from the cylinder tube; and the bottom-side shaft hole includes
- an opening end open in the bottom-side chamber, and
- a tip formed inside the piston rod.

* * * * *